United States Patent [19]

Fencl

[11] 4,260,852
[45] Apr. 7, 1981

[54] UP/DOWN SCANNING DIGITIZING APPARATUS AND METHOD

[75] Inventor: George A. Fencl, Phoenix, Ariz.

[73] Assignee: Talos Systems, Inc., Scottsdale, Ariz.

[21] Appl. No.: 42,093

[22] Filed: May 24, 1979

[51] Int. Cl.³ .......................................... G08C 21/00
[52] U.S. Cl. ...................................................... 178/19
[58] Field of Search ................................... 178/19, 18

[56] References Cited

U.S. PATENT DOCUMENTS

| 3,801,733 | 4/1974 | Bailey | 178/19 |
| 3,904,822 | 9/1975 | Kamm et al. | 178/19 |
| 4,054,746 | 10/1977 | Kamm | 178/19 |

Primary Examiner—Thomas W. Brown
Attorney, Agent, or Firm—Louis Etlinger

[57] ABSTRACT

A digitizing system includes a plurality of spaced parallel grid conductors embedded beneath a support surface. A movable pen coil powered by an amplifier induces AC signals in the grid conductors. The grid conductors are scanned at a first rate from a reference point to detect the approximate location of the pen coil. The grid conductors are then "up scanned" at a second rate toward the pen coil. As the scan counter is incremented, a pen position counter is simultaneously incremented at a third rate which is substantially greater than the second rate to effect interpolation between grid conductors. The up scanning is halted when a rectified and integrated waveform resulting from the up scanning operation undergoes a phase change. A first digital number contained in the pen position counter then is stored. The polarity of the signal driving the pen coil then is reversed. The grid conductors are then "down scanned" at the second rate toward the pen coil. The scan counter is decremented from a preset value at the second rate to effect the down scanning. The pen position counter is simultaneously decremented at the third rate from a preset value. The down scanning is halted when a rectified and integrated waveform resulting from the down scanning undergoes a phase change. A second digital number contained in the pen position counter is averaged with the first digital number to provide an accurate interpolated number representing the location of the pen coil.

24 Claims, 16 Drawing Figures

UP/DOWN SCANNING DIGITIZING APPARATUS AND METHOD

BACKGROUND OF THE INVENTION

1. Field of the Invention

The invention relates to digitizing apparatus and methods, and more specifically to digitizing apparatus and methods for improving accuracy of interpolation between spaced grid conductors in digitizers and compensating for errors due to tilting of a pen and variations in pen height.

2. Description of the Prior Art

Various high resolution apparatus for translating a position of a movable instrument, such as a cursor or a pen, into digital signals for transmission to a utilization device are well known in the art. Such digitizing devices generally include a rigid support structure suitable for supporting a work sheet such as a graph, chart, or piece of industrial artwork to be digitized or a blank sheet upon which a pen can make marks, the location of which marks are to be digitized. A grid or matrix of conductors ordinarily is embedded immediately beneath the support surface. If the movable instrument is a pen, it is positioned over and pressed against the work sheet and is moved to trace various patterns on the work sheet, points of which patterns are to be digitized. If the movable instrument is a cursor, it is aligned with various pre-existing points or marks on the work sheet, which points or marks are to be digitized. The state of the art for digitizers is indicated by U.S. Pat. Nos. 3,767,858, 3,851,097, 3,983,322, 3,886,311 and 4,022,971, all assigned to the present assignee. The state of the art is further indicated by co-pending patent application Ser. No. 921,514 by George A. Fencl, filed on July 3, 1978, and assigned to the present assignee, now U.S. Pat. No. 4,185,165. Digitizers described in the foregoing prior art have relatively high accuracy or resolution. However, the cost of such digitizers increases rapidly as the resolution increases. There are several sources of inaccuracy in the above digitizers, one of the most important being the difficulty in accurately interpolating or determining the position of the pen or cursor when it is located at a point between two adjacent grid conductors. Non-linearity in the characteristic waveform produced by the output of the filter in the above mentioned co-pending Fencl application significantly reduces the accuracy of interpolation obtained by incrementing a pen position counter at a constant rate during the process of scanning the grid conductors in a particular direction. An analogous problem exists in digitizers wherein signals are transmitted from the scanned grid conductors rather than received by them.

Accordingly, it is an object of the invention to provide a low cost, high accuracy digitizer having improved accuracy of interpolation of pen or cursor position at points located between grid conductors.

Another problem with digitizers constructed in accordance with the known prior art is that it is often necessary to decrease the spacing between grid conductors to achieve high accuracy. This greatly increases expense and also increases time required for performing digitizing operations, since a larger number of conductors must be scanned. Another problem of prior digitizers is high power dissipation in the pen or cursor coils.

It is therefore another object of the invention to provide an improved high accuracy digitizer having reduced power dissipation.

Another source of inaccuracy in prior digitizers having pens results from tilting of the pens, causing assymmetrical interaction of magnetic field lines and grid conductors and consequent loss of accuracy of the scanning procedures used.

Accordingly, it is a further object of the invention to provide a digitizing apparatus and method for economically, quickly, and accurately compensating for pen tilt to provide high accuracy digitizing.

SUMMARY OF THE INVENTION

Briefly described, and in accordance with one embodiment thereof, the invention provides apparatus and method for decreasing digitizing errors due to interpolation between grid conductors in a digitizer to determine location of a pen coil or cursor coil with respect to the grid conductors. In the described embodiment of the invention, a digitizing system includes a plurality of spaced parallel grid conductors oriented in the X direction embedded in a support surface of a tablet and a second plurality of spaced parallel grid conductors similarly oriented in the Y direction. In the described embodiment of the invention, an AC signal drives the pen coil, causing it to induce signals in the grid conductors. The digitizer includes a scanning circuit for sequentially sensing the signals induced in the grid conductors by a pen coil. The digitizer further includes an analog circuit which produces an output signal which changes phase when the scanning circuit senses a grid conductor having an induced signal which is out of phase with the induced signal in the previously sensed grid conductor. The scanning circuit includes an X multiplexer which sequentially connects the X grid conductors to the input of the analog circuit and a Y multiplexer which sequentially connects the Y conductors to the input of the analog circuit. The analog circuit includes an amplifier having its input connected to the multiplexer circuits, phase sensitive detector circuitry to rectify the amplifier output, filter circuitry to integrate the phase sensitive detector outputs, and a comparator for producing a signal indicating occurrence of a phase change in the waveform of the output signal produced by the filter circuitry. Scan control circuitry controls the scanning of grid conductors in the X and Y directions, and includes a pre-settable up/down scan counter circuit which generates addresses which control the multiplexers. A pen position counter circuit is incremented at two hundred times the rate at which the scan counter is incremented, and provides a binary coded decimal output which is transmitted to a microprocessor system. The pen position counter also includes an up/down pre-settable counter. Clock signals utilized to increment the pen position counter and the scan counter are gated by a signal produced by the comparator output to stop counting of the two counters when a phase change in the filter output voltage occurs. In order to obtain the location of the pen with respect to the X conductors, the microprocessor system causes the scan counter to sequentially address the X multiplexer, causing the X conductors to be scanned from a reference point on one side of the pen toward the location of the pen until the filter output voltage undergoes a phase change, indicating sensing of the first grid conductor located on the opposite side of the pen. The microprocessor then pre-sets the scan counter to a first number which represents the location of a second grid conductor located two inches from the first grid conductor and also pre-sets a corresponding number in the pen position counter. The microprocessor then causes "up scanning" from the second grid conductor at an decreased rate toward the pen until a phase change is detected in the output of the filter. The comparator output signal causes the up scanning to stop. A first binary coded decimal number stored in the pen position counter is transferred to and stored in the microprocessor system. The microprocessor system then causes a second number representing the location of a third grid conductor located two inches on the opposite side of the first grid conductor to be pre-set into the pen position counter. The microprocessor then causes the polarity of the AC signal driving the pen coil to be reversed. The microprocessor then causes a "down scanning" operation to be performed wherein the pen position counter and the scan counter are decremented, again at the decreased rate until a phase change in the filter output voltage is detected by the comparator; this halts the down scanning. A second binary coded decimal number stored in the pen position counter is transferred to the microprocessor system, which computes the average of the first and second binary coded decimal numbers. The average number computed represents the precise location of the pen. The up/down scanning and averaging technique compensates for non-linearity in the transistion of the filter output voltage waveform between the positive and negative peaks of the waveform as scanning occurs beneath the pen coil, providing highly accurate interpolation when the pen coil is positioned directly above a point located between adjacent grid conductors.

In another embodiment of the invention, peak detector circuitry connected to the filter output detects the peak positive voltages of the filter output waveform during the up scan and down scan operations. An analog to digital converter converts the two peak voltages to digital numbers which are transmitted to the microprocessor system. The microprocessor system computes the ratio between the peak voltages and performs a computation of a correction factor to be added to the averaged pen location value to correct for pen tilt. The computation involves a table look-up operation to fetch experimentally determined coordinate correction quantities which correspond to the value of the computed ratio.

In another embodiment of the invention wherein a cursor is utilized, a conductive guard ring having a diameter larger than the cursor coil is supported concentrically with the coil and reduces the magnetic field produced by the cursor coil beyond the guard ring, so that the up scanning and down scanning operations are relatively unaffected by signals induced in conductors scanned during the early portions of the up scanning and down scanning operations. This greatly linearizes the slope of the output signal from the filter during its transition from a positive to a negative peak, further improving accuracy of the digitizing process.

DESCRIPTION OF THE INVENTION

Figure 1A:
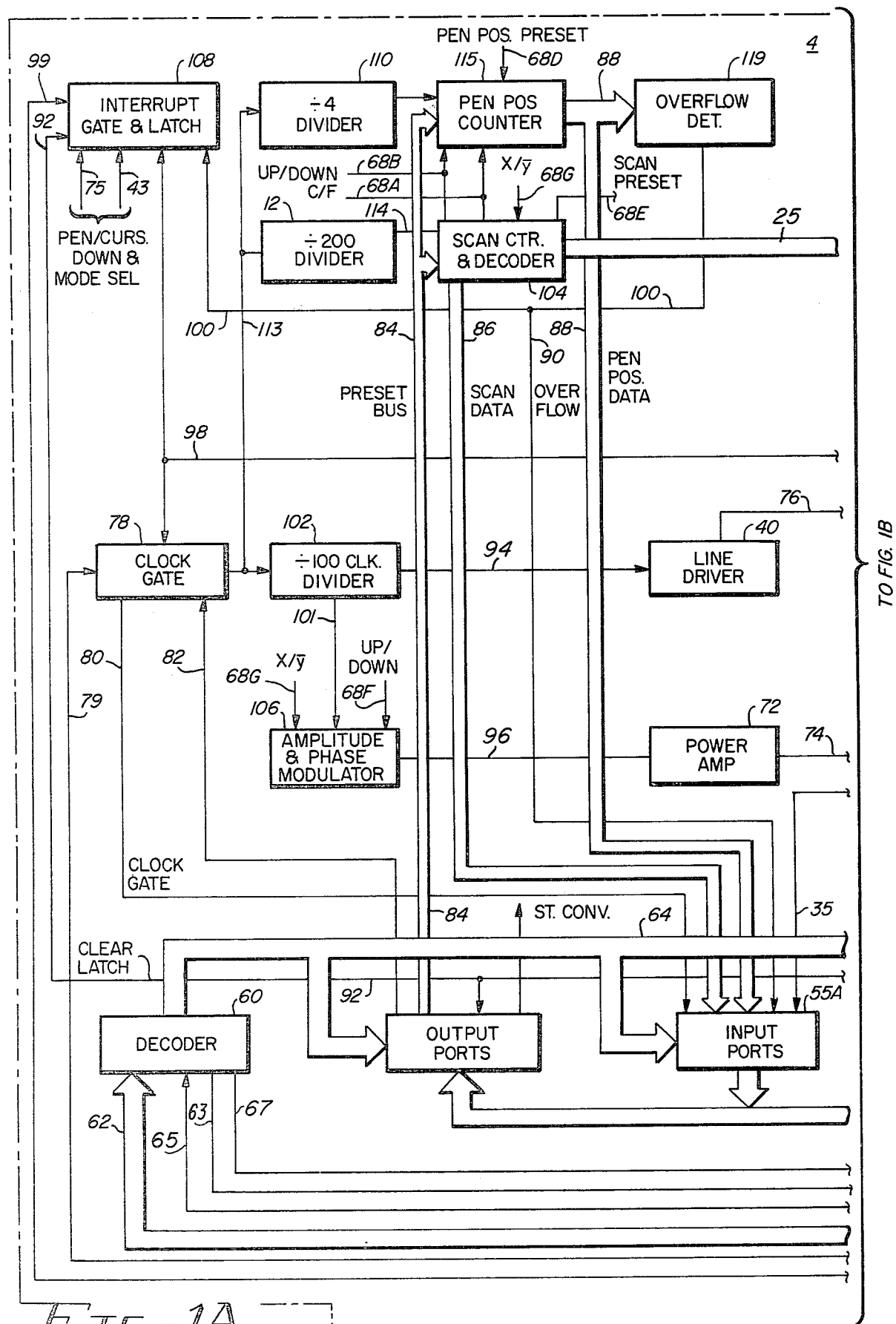
FIGS. 1A and 1B together constitute a detailed block diagram of the digitizing system of the invention.
Figure 1B:
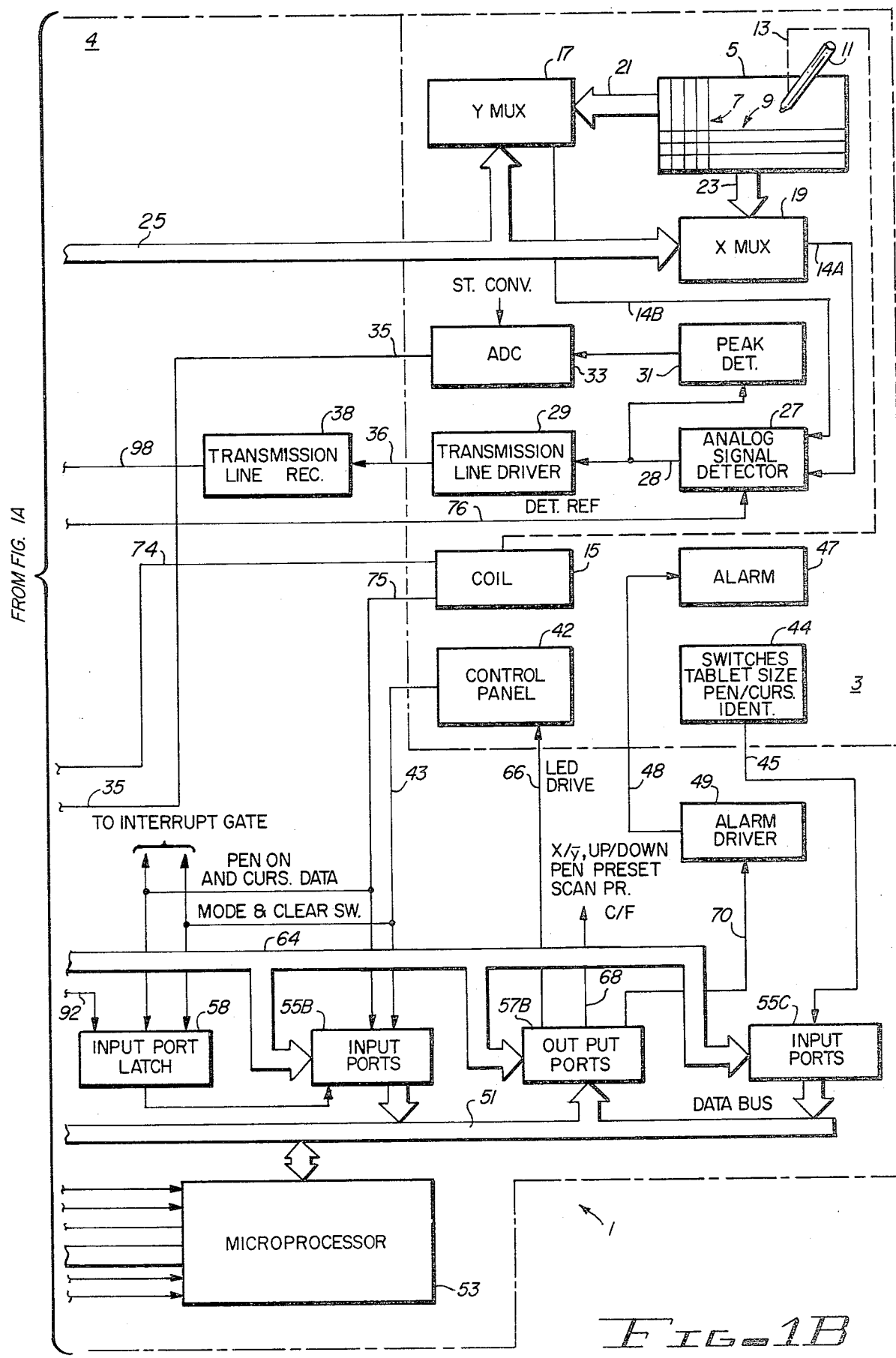

Referring now to FIGS. 1A and 1B, digitizer system 1 includes a subsystem 3 including known digitizer components and a scan control subsystem 4 coupled to a microprocessor system 53. Subsystem 3 includes a tablet or surface 5 for supporting a work sheet having points thereon to be digitized. Tablet 5 includes a plurality of Y conductors 9 which are uniformly spaced 200 mils apart in the Y direction and are imbedded in the surface of tablet 5. Tablet 5 also includes a plurality of X conductors 7 uniformly spaced 200 mils apart in the X direction and imbedded in the supporting surface of tablet 5.

A pen or cursor 11 can be positioned over points on a work sheet supported by tablet 5 and aligned with points to be digitized. If a pen is utilized, it can be of the type described in co-pending patent application entitled "PEN STATUS SYSTEM FOR DIGITIZER PEN", Ser. No. 005,195, filed Jan. 22, 1979, by George A. Fencl, assigned to the present assignee, incorporated herein by reference and referred to as the "first Fencl application". The pen described in the co-pending first Fencl application includes a pen coil mounted near the writing tip of pen 15, which pen coil is schematically represented by block 15 in FIG. 1. Although pen coil 15 is actually located close to the writing tip of pen 11, as explained in the co-pending first Fencl application, dotted line 13 is utilized herein to describe the relationship of pen coil 15 to pen 11, since it would be inconvenient to otherwise illustrate pen coil 15 in FIG. 1.

The individual Y conductors 9 in FIG. 1B are connected by means of bus 21 to Y multiplexer 17, which selectively couples the electrical signal induced by pen coil 15 in the presently selected Y conductor to multiplexer output conductor 14B. Multiplexer output conductor 14B is connected to an input of analog signal detector circuitry 27. Similarly, the individual X conductors 7 in FIG. 1B are connected by means of bus 23 to X multiplexer 19, which selectively couples the electrical signal induced on the selected X conductor to multiplexer output conductor 14A, which is also connected to an input of analog signal detector circuitry 27.

Addresses to Y multiplexer 17 and X multiplexer 19 are produced on bus 25, which is connected to the digital outputs of scan counter and decoder circuitry 104. Enable signals for Y multiplexer 17 and X multiplexer 19, respectively, are conducted on respective conductors of bus 25, since the X and Y directions of tablet 5 are scanned one at a time.

Analog signal detector circuitry 27 provides an output signal on conductor 28. The output signal is produced by a filter circuit in analog signal detector circuitry and has a characteristic waveform, illustrated in FIGS. 4, 5, 8A and 8B herein for different operating conditions. The characteristic waveform is described at length hereinafter. Conductor 28 is connected to the input of a transmission line driver circuit 29, which drives a cable 36, which may be approximately six feet in length and is connected to an input of transmission line receiver circuit 38. Analog signal detector circuitry 27 receives a reference timing signal on conductor 76.

Pen coil 15 receives a drive signal on a pair of conductors designated by reference numeral 74. The AC signal on conductors 74 is referred to as the "pen drive signal", and causes pen coil 15 to radiate a symmetrical magnetic field which induces electrical signals having amplitudes of up to approximately several millivolts on the X conductors 7 and Y conductors 9 of tablet 5, depending upon their distance from pen coil 15.

The pen drive signal on conductors 74 is produced by power amplifier circuit 72. Further details of Y multiplexer 17, X multiplexer 19, analog signal detector circuit 27, pen coil 15, and power amplifier 72 are disclosed in the co-pending patent application entitled "LOW NOISE SYSTEM AND METHOD FOR SEQUENTIALLY SENSING INDUCED SIGNALS IN DIGITIZER GRID CONDUCTORS", Ser. No. 921,514, filed on July 3, 1978, (now U.S. Pat. No. 4,185,165) by George A. Fencl, assigned to the present assignee, incorporated herein by reference, and hereinafter referred to as the "second Fencl application".

Subsystem 3 further includes a control panel 42 which is connected by means of a plurality of conductors 43 to a plurality of respective input ports of block 55. The control panel allows the operator to send control signal to microprocessor system 53 to effect desired operation of digitizer system 1.

Subsystem 3 also includes a switch module 44 which is connected by means of a plurality of conductors 45 to a plurality of respective input ports of block 55 to enable the operator to establish certain parameters, such as tablet size, and to identify whether a pen or a cursor is being utilized.

An audio alarm 47, which may consist of a small speaker, is connected by means of cable 48 to alarm driver circuit 49. Alarm driver circuit 49 has an input connected to conductor 70, which is connected to an output port of block 57. This permits microprocessor system 53 to send an alarm signal to alarm driver 49 so that the microprocessor system can alert the operator to the occurrence of certain conditions, such as completion of operation by microprocessor system 53 on the last block of data sent to microprocessor system 53; the operator then would, for example, realise that he or she can move the cursor or pen to another data point.

Scan control subsystem 4 includes pen position counter 115, scan counter and decoder circuit 104, and amplitude and phase modulator circuitry 106 as central components. Pen position counter 115 and scan counter and decoder circuit 104 both include pre-settable up/down counters. The pre-settable up/down counter in pen position counter 115 has twenty-four bits and can be implemented using 74LS668 binary coded decimal pre-settable up/down integrated circuit counter, manufactured by various semiconductor companies such as Texas Instruments. The counter in scan counter and decoder 104 includes nine bits and can be implemented using a 74LS669 binary pre-settable up/down counter, which is manufactured by various semiconductor companies.

A plurality of conductors are included in preset bus 84 and are connected to the respective preset inputs of pen position counter 115 and scan counter and decoder circuit 104. Information is produced on the respective conductors of preset bus 84 by output port circuits in block 57.

It should be noted that microprocessor system 53 is connected to scan control subsystem 4 by means of an eight bit bidirectional data bus 51, the respective conductors of which are connected to corresponding conductors of a plurality of output port circuits 57 and a plurality of input port circuits 55. Note that for convenience, the input port blocks 55 are drawn as three separate blocks. However, they can be considered to be a single block containing a plurality of three state inverter circuits. Similarly, the output port blocks 57 are shown as two separate blocks, but can be considered to be a single block containing a plurality of integrated circuit latches. Microprocessor system 53 is also connected to scan control subsystem 4 by means of a sixteen bit address bus 62, an input/output control conductor 63, and a read/write control conductor 65, all of which are connected to decoder circuit 60. An acknowledge signal is produced by decoder circuit 60 on conductor 67 to signal the microprocessor system when acceptable codes have been inputted to decoder 60 by microprocessor system 53.

Scan counter and decoder circuit 104 is incremented by a signal produced on conductor 114 by fixed ratio divider circuit 112, which divides a 9 megahertz signal on conductor 113 by a factor of 200 to determine the converting rate of scan counter and decoder circuit 104. The signal on conductor 113 is produced by the output of clock gate circuit 78 which receives a 9 megahertz continuous clock signal on conductor 79 as an input. The signal on conductor 98 is produced by transmission line receiver 38 to disable clock gate circuit 78 when the position of pen 11 has been detected during scanning in either the X or Y direction of tablet 5. In other words, when "good data" is detected at one of grid conductors 7 or 9 being scanned, both pen position counter 115 and scan counter and decoder circuit 104 are stopped by the signal on conductor 98. The signal on conductor 80, which is conducted between an output of clock gate circuit 78, an input port circuit of input port block 55 performs the function of allowing microprocessor system 53 to receive information indication of whether a "good data" signal has been received by clock gate 78 from conductor 98. Clock gate 78 is readily implemented utilizing an LS74 FlipFlop integrated circuit and an LS00 NAND gate, both readily available from Texas Instruments, Inc.

The decoder portion of the scan counter and decoder circuit 104 includes a 74LS42 one of ten decoder, readily available from Texas Instruments, Inc., and performs the function of selecting a particular one of a plurality of printed circuit boards containing X multiplexer circuitry 19 and Y multiplexer circuitry 17 by decoding three bits of the scan counter portion of circuit 104.

Variable ratio divider circuit 110 has an input connected to conductor 113 and divides the signal on conductor 113 by four, although this divisor can be varied by means of an external jumper connections. This permits the accuracy or resolution of digitizer system 1 to be adjusted to suit varying product needs. Variable ratio divider circuit 110 can be readily implemented by means of 74LS00 FlipFlop and a 74LS500 NAND, available from Texas Instruments, Inc.

The signal produced by clock gate 78 on conductor 113 is provided as an input to clock divider circuit 102, which divides by a factor of 100, and is readily implemented by a Texas Instrument LS196 integrated circuit to produce a divided-down signal on conductor 94 when clock gate 78 is enabled. This signal functions as an input to a transmission line driver circuit 40, which produces the reference clock signal on conductor 76, which is connected to the inputs of two phase sensitive detector circuits included in analog signal detector circuitry 27. Line driver circuit 40 can be implemented with a 7405 integrated circuit line driver, readily available from Texas Instruments, Inc.

Another output conductor 101 of clock divider circuit 102 conducts a signal which is equal to the signal on conductor 113 divided by a factor 100. This signal is inputted to amplitude and phase modulator circuit 106. The purpose of amplitude and phase modulator circuit 106 is to reverse the phase of the pen drive signal produced by power amplifier 72 when scanning in the "X" down or "Y" up directions. Amplitude and phase modulator circuit 106 includes a LS04 hex inverter integrated circuit and a LS00 quad NAND integrated circuit, both from Texas Instruments, Inc. Conductor 68G and conductor 68F are provided as inputs to amplitude and phase modulator circuit 106. (Note bus 68 connected to output port block 57 includes conductors 68A–68G). A signal designated $X/\overline{Y}$ applied to conductor 68G by one of output port blocks 57 indicates whether the X conductors 7 or the Y conductors 9 are to be scanned, and a signal UP/$\overline{DOWN}$ indicates whether the scanning operation is to be an "up scan" or a "down scan" operation, which operations are explained hereinafter. When the $X/\overline{Y}$ signal on conductor 68G is a logical "0", amplitude and phase modulator circuit 106 causes an increase in the amplitude of the output signal produced on conductor 96 to compensate for the fact that the Y conductors 9 in tablet 5 are embedded deeper beneath the surface than X conductors 7 (which would otherwise result in signals induced in the Y conductors by pen coil 15 having slightly lower amplitudes than the signals induced in the X conductors). The UP/$\overline{DOWN}$ signal on conductor 68F causes a phase reversal of the output signal produced on conductor 96. Power amplifier 72, of course, amplifies the signal on conductor 96 to provide the pen drive signal on conductor 74 to drive pen coil 15, as explained in the co-pending second Fencl application.

Power amplifier 72 is readily implemented utilizing a National Semiconductor LM380 integrated circuit amplifier. Transmission line drivers 29 and 40 are readily implemented utilizing Texas Instruments, Inc.'s 7405 integrated circuit driver, and merely perform the function of maintaining integrity of the input signals applied thereto as they are transmitted over cables 36 and 76, respectively. Transmission line receive 38 is readily implemented by means of a National Semiconductor LM311 integrated circuit.

Output port blocks 57 and input port blocks 55 are implemented utilizing Texas Instruments, Inc.'s LS374 octal latch integrated circuits and 74LS 240 eight bit inverter integrated circuits, respectively.

Interrupt gate and latch circuit 108 causes an interrupt signal to be produced on interrupt conductor 99 in response to an overflow signal on conductor 100 or a "good data" signal on conductor 98. This notifies microprocessor system 53 that an appropriate subroutine must be executed. For example, if a "good data" signal has been detected, the contents of the pen position counter 115 will be read by microprocessor system 53 via pen position data bus 88 and corresponding input ports of input block 55 and data bus 51. If an overflow condition has been detected, microprocessor system 53 may take whatever action the operating algorithm of microprocessor 53 dictates, such as causing alarm 47 to alert the operator. Those skilled in the art could readily provide whatever type of interrupt subroutine would be necessary to appropriately respond to an interrupt signal on conductor 99.

An overflow condition signal on conductor 100 is generated by overflow detector circuit 119 when pen position counter 115 counts past its maximum (i.e. all "ones") condition. If this happens, it indicates that no good data has been detected during an entire X scan or an entire Y scan, possibly indicating that the pen or cursor was not being held close enough to the surface of tablet 5 as the underlying conductors are scanned.

The commercially available parts and the connections which may be utilized to implement the Y multiplexer 17, and X multiplexer 19 analog signal detector circuit 27 are shown in considerable detail in the copending second Fencl application, mentioned above and incorporated herein by reference. However, the phase sensitive detector circuitry and filter circuitry disclosed in the above mentioned copending second Fencl application is changed in the presently preferred embodiment of the invention in order to obtain improved immunity to variations in power supply amplitude and ground line noise by eliminating the threshold circuit which is provided as one input of the comparator. The later scheme is shown in FIG. 2.

Microprocessor system 53 can be implemented using an Itel 80/10A microprocessor subsystem, which includes a random access memory.

Figure 2:
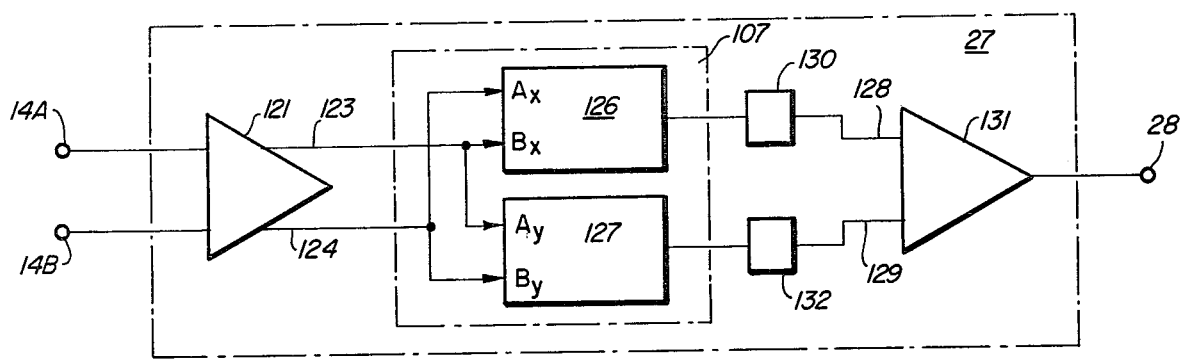
FIG. 2 is a block diagram of the analog signal detector section of the digitizing system of FIGS. 1A and 1B.

Referring now to FIG. 2, analog signal detector circuitry 27 includes a differential amplifier 121 having its respective inputs coupled to multiplexer output conductors 14A and 14B, respectively. The signals on multiplexer output conductors 14A and 14B are actually capacitively coupled to the inputs of differential amplifier 21 by means of capacitors and bias circuitry which have been omitted for clarity, and could readily be provided by those skilled in the art. Differential amplifier 121 may be readily implemented by a Fairchild A733C integrated circuit which has a pair of complimentary outputs connected to conductors 123 and 124, respectively. Conductors 123 and 124 are coupled to phase sensitive detector circuitry 107, which may be implemented by means of a CD4053 integrated circuit analog switch manufactured by RCA, as described in detail in the above mentioned second Fencl application. Phase sensitive detector circuitry 107 includes two phase sensitive detectors 126 and 127. Conductor 123 is coupled to the $B_x$ input of phase sensitive detector 126 and the $A_y$ of phase sensitive detector 127. Conductor 124 is coupled to the $A_x$ input of phase sensitive detector 126 and the $B_y$ input of phase sensitive detector 127. The outputs of phase sensitive detectors 126 and 127 are coupled to the respective inputs of a pair of low pass filters 130 and 132 (which can be implemented by RCA Model CA3130 integrated circuit op amps) having their respective outputs 128 and 129 coupled to the respective inputs of comparator 131, which may be implemented utilizing a National Semiconductor LM311 integrated circuit, and which has an output connected to conductor 28. The details of the circuitry used to implement the blocks of FIG. 2 are set forth in the co-pending second Fencl application, and are not repeated herein. (It should be noted that the coupling referred to is capacitive coupling, the details of which have been omitted for clarity.) The basic operation of subsystem 3 of digitizer system 1, including the operation of the X and Y multiplexers, the phase sensitive detectors and the low pass filters, is set forth in detail in the above mentioned co-pending second Fencl application, and will not be repeated herein.

Figure 3:
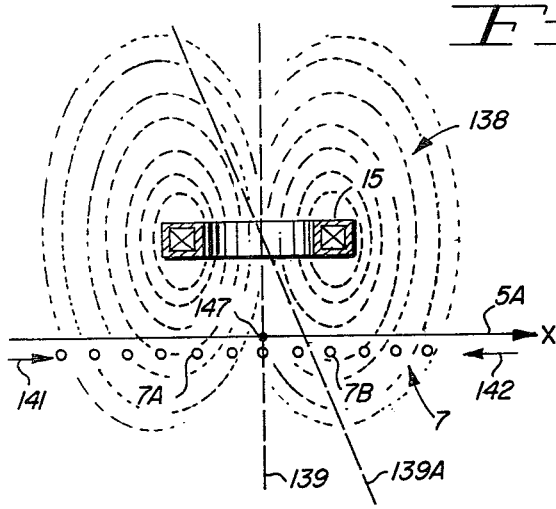
FIG. 3 is a partial sectional view showing the pen coil and grid conductors of the tablet and pen of FIGS. 1A and 1B.
Figure 4:
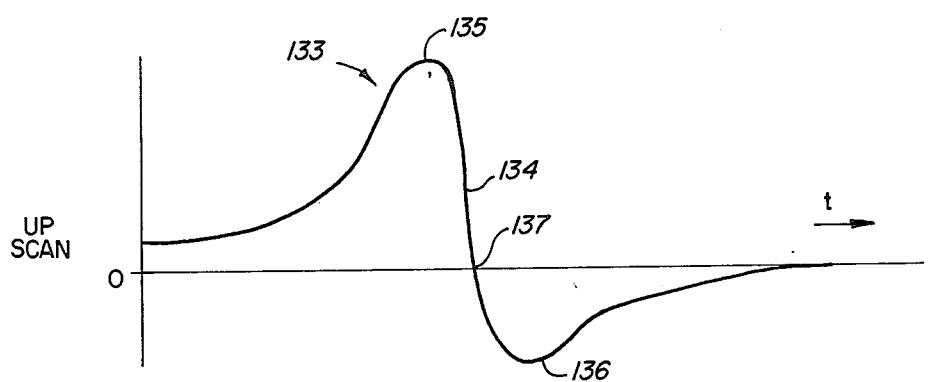
FIG. 4 shows a typical waveform of the output of filter 130 of FIG. 2 during the up scanning operation of the invention.
Figure 5:
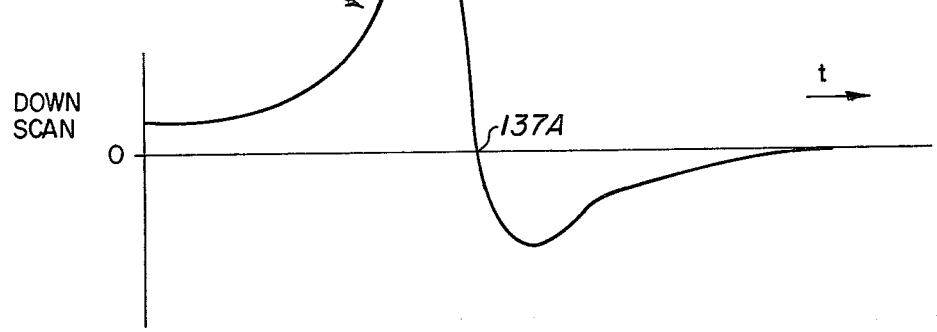
FIG. 5 is a waveform of the output voltage of filter 130 of FIG. 2 during the down scanning operation of the invention.

The operation and advantages of scan control subsystem 4 is best understood by reference to FIGS. 3–5. As explained in the above mentioned co-pending second Fencl application, a characteristic signal such as the one shown in curve 133 of FIG. 4 is obtained at the output 128 of filter circuit 130 in FIG. 2 as the grid conductors are scanned from the −X side of the pen coil to the +X side. (The waveforms at filter outputs 128 and 129 are complements of each other, as mentioned above.) The present scan control circuitry subsystem 4 compensates for non-linearity in the characteristic 133 of FIG. 4 during the transition 134 between the positive and negative peaks 135 and 136, respectively.

In accordance with the present invention, the above mentioned non-linearity is compensated for by performing a dual scanning procedure, first scanning "up" to a grid conductor corresponding to a certain point of the characteristic waveform from a first grid conductor on the −X side of the pen coil, and then scanning "down" to a grid conductor corresponding to a certain point of the characteristic waveform from a second grid conductor on the +X side of the pen coil.

Referring now to FIG. 3, pen coil (or cursor coil) 15 is disposed slightly above (approximately 200 mils) surface 5A of tablet 5. The X conductors are embedded beneath surface 5A, and are generally designated by reference numeral 7. The symmetrical magnetic field produced by pen coil 15 is generally designated by reference numeral 138. It can be seen that different numbers of flux lines of magnetic field 138 loop around the various respective grid conductors, causing electric signals of varying amplitude to be induced therein. The amplitude of the electrical signals induced in a particular grid conductor depends, of course, upon the number of flux lines looping around that grid conductor, and hence, upon the distance of that grid conductor from the pen coil.

In accordance with one embodiment of the present invention, the grid conductors located to the left of vertical axis 139 of pen coil 15 are scanned in the "up" direction indicated by reference numeral 141 (i.e., in the +X direction) from a grid conductor located a predetermined distance (i.e., two inches) from a grid conductor located during a preliminary "coarse" scan in the +X direction from an arbitrary distant origin point. If a "single ended" system of the type described in the co-pending second Fencl application is utilized, wherein a single filter output is inputted to the comparator and compared to a fixed threshold voltage, then scanning of grid conductors in the direction indicated by arrow 141 continues until the output signal from the filter (such as 130 in FIG. 2) exceeds the predetermined threshold. Assume that this occurs as grid conductor 7A is scanned. The scan counter and the pen position counter then are halted by the resulting signal on a conductor such as 98 and the response thereto of circuitry, such as clock gate 78. In accordance with the present invention, the digital number stored in the pen position counter is transmitted to a microprocessor system, which stores that digital number. The digital number referred to represents the approximate location of the pen coil with respect to the X grid conductors, and in accordance with details to be subsequently described, a second scan or "down" scan is begun at a grid conductor located a predetermined distance (i.e., two inches) to the right of the above mentioned grid conductor (located by means of the "coarse scan"), and is continued in the −X direction, as indicated by arrow 142. When the above mentioned fixed threshold level is exceeded by the output of the filter circuit, the scan counter and pen position counter will again be halted, and a second digital number corresponding to another approximation of the location of the pen coil will be transmitted to the microprocessor system. Since the magnetic field is symmetrical, if axis 39 is vertical with respect to surface 5A, the above fixed threshold level will probably be exceeded when conductor 7B is being scanned. The two digital numbers are then averaged. The averaged value provides a more accurate value of the true location of pen coil 15 with respect to the grid conductors. It should be noted that during the down scan operation, the polarity of the signal driving pen coil 15 can be reversed so that the polarity of the leading edge of the filter output voltage will be positive during both the up scan and the down scan operations.

The orientation of the axis 139 (which is perpendicular to the plane of pen coil 15) is vertical in FIG. 3, as explained above. In this case, the pen (not shown) to which the pen coil is attached is also vertical. Under these conditions, the magnetic field flux lines indicated by reference numeral 138 are symmetrically oriented about pen coil 15, and the above up scan/down scan/averaging technique results in a very precise digital number corresponding to the location of pen coil 15 with respect to the grid. The accuracy is surprisingly independent of small variations in height of the pen coil above surface 5A. This occurs because of the symmetrical manner in which magnetic field 138 cuts the grid conductors on either side of vertical axis 139.

Figure 6:
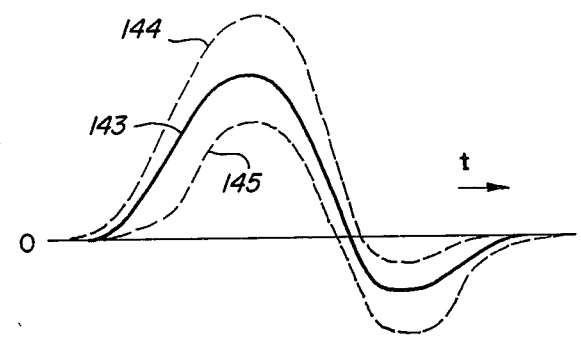
FIG. 6 is a typical waveform for the output voltage of filter 130 of FIG. 2 illustrating variations due to pen tilt.

However, if the pen is tilted so that axis 139 tilts, as indicated by reference numeral 139A, the flux lines of magnetic field 138 do not symmetrically loop around conductors on both sides of the point immediately directly beneath pen coil 15. This produces an error in the average pen location value obtained by the above described method. However, it can be seen by referring to FIG. 6 that if curve 143 represents the filter output voltage on conductor 128 of FIG. 2 when the pen is perfectly vertical, then waveform 144 represents the waveform which will appear on conductor 128 if the pen is tilted to the left. Since a larger number of magnetic flux lines will loop around each grid conductor to the left of point 147 in FIG. 3, larger voltages will be induced in each of them. Therefore, the integrating effect of the low pass filter results in a larger amplitude for the portion of the waveform corresponding to the −X portion of the up scanning operation. Similarly, fewer flux lines will loop around grid conductors to the right of point 147 in FIG. 3, resulting in a lower negative peak. A similar analysis indicates that if the pen is tilted to the right, the positive peak will be less, and the negative peak will be greater, as shown by curve 145 in FIG. 6.

Microprocessor system 53 includes a stored look-up table in which empirically derived data which matches the ratios of the peak values obtained during the up scan and down scan operations are stored. Microprocessor system 53 can therefore determine if the pen is being tilted by measuring the two peak values of the filter output voltages occurring during an up scan operation and a corresponding down scan operation, and computing their ratio. A ratio other than one indicates existence of pen tilt. The ratio is then utilized to address the look-up table to obtain the correction factors which must be added to or subtracted from the averaged figure obtained in the foregoing up scan, down scan, and compute average operations.

The measurement of the above mentioned peak values is accomplished by means of peak detector circuit 31, which has an input connected to conductor 28 in FIG. 1. Those skilled in the art can readily provide various circuits of the sample-and-hold variety which are capable of detecting and storing a peak value of an analog signal. The output of peak detector 31 is provided as an input to analog-to-digital converter 33, which converts the peak value to a digital number which is conducted by means of bus 35 to microprocessor system 53 via input ports of block 55 and data bus 51. Microprocessor system 53 then computes the ratio of the above described peak values and performs the table look-up operation to obtain the necessary correction factor.

It should be noted that the polarity of the pen drive signal driving pen coil 15 should be reversed during the down scan portion of the operation, so that circuitry of analog signal detector 27 encounters the same polarity signal levels during both the down scan and up scan portions of the operation.

It should be emphasized that the foregoing description with reference to FIG. 3 applies to an embodiment of the invention which utilizes the type of single ended analog signal detection circuitry disclosed in the above mentioned co-pending second Fencl application, wherein a fixed threshold level is applied to one input of the comparator having its other input connected to the output of the filter circuit.

In accordance with the embodiment of the invention which utilizes the arrangement shown in FIG. 2 of the present application, "good data" is detected when the output filter signals on conductors 128 and 129 in FIG. 2 change polarity, rather than when one of them exceeds a fixed threshold voltage. For example, curve 133 of FIG. 4 could be the signal appearing on conductor 128 in FIG. 2 during an up scan operation. For the circuitry shown in FIG. 2, a signal which is identical to but of opposite polarity to the signal on conductor 128 appears on conductor 129, as will be readily recognized by those skilled in the art. A "good data" signal will be produced at the output of the comparator 131 on conductor 28 when its polarity changes, i.e., at point 137 on curve 133 of FIG. 4.

It should be noted that in accordance with the present invention, it is necessary to initially scan the X grid conductors from a distant origin to locate the approximate position of pen coil 15 with respect to the X grid conductors. This is accomplished by performing a preliminary high speed scan referred to hereinafter as a "coarse scan". Next, the up scan operation is initiated by first pre-setting contents of pen position counter 115 and the scan counter and decoder circuit 104 to digital offset numbers which represent the equivalent of two inches in the −X direction from the value obtained during the coarse scan. The up scan is begun at a lower speed from the grid conductor corresponding to "offset" value present into scan counter and decoder circuit 104. During the up scan, both scan counter and decoder circuit 104 and pen position counter 116 continue to count, the pen position counter counting at a rate greatly exceeding the rate of the scan counter and decoder circuit. A waveform such as waveform 133 of FIG. 4 is the resulting waveform produced at output 128 of filter 130. When the output signals from conductors 128 and 129 undergo polarity changes (i.e., at point 137 of waveform 133 in FIG. 4), a "good data" signal is produced on conductor 28, causing clock gate 78 to halt pen position counter 115 and scan counter and decoder circuit 104. The digital number stored in pen position counter 115 then is transmitted by means of pen position bus 88 via input port block 55 and data bus 51 to microprocessor system 53. This digital number is referred to as the "up scan location number". Similarly, before the down scan counter operation is begun, pen position counter 115 and scan counter and decoder circuit 104 are preset to contain digital offset numbers which correspond to a location two inches to the right of the above approximate pen coil location value. The down scan operation is then begun at the lower speed by decrementing pen position counter 115 and scan counter and decoder circuit 104 (UP/$\overline{\text{DOWN}}$ conductor 68F having a logical zero applied thereto), causing both counters to be decremented rather than incremented. The down scan operation causes a waveform such as 133A of FIG. 4 to be produced at output conductor 128 of filter 130. The up and down scan operations are referred to as "fine" scan operations.

When the signals at filter output conductors 128 and 129 undergo their respective phase changes (i.e., at point 137A of waveform 133A in FIG. 5), comparator 131 (FIG. 2) reverses its output level, producing a signal on conductor 98 which causes pen position counter 115 and scan counter and decoder circuit 104 to be halted, as explained above. Again, the digital number stored in pen position counter 115, referred to as the "down scan location number" is transferred to and stored in microprocessor system 53. The average value of the stored down scan location number and the stored up scan location number is computed to provide a precise interpolated number which represents the location (i.e., the X coordinate) of the center of pen coil 15.

The waveform appearing on filter output 128 during the down scan is shown by curve 133A in FIG. 5. It should be noted that this curve is essentially identical to the curve shown in FIG. 4 since both the polarity of the pen drive signal produced on conductor 74 in FIG. 1 as well as the direction of the scanning of grid conductors has been reversed.

It has been found that the effect of the above up scan, down scan, averaging technique is to compensate for non-linearity in the slope section 134 of waveform 133 between peaks 135 and 136, as shown in FIG. 4. It is to be noted that although the slope 134 is roughly linear, and is suitable for comparatively low resolution digitizing as accomplished by the digitizing system described in the above mentioned copending second Fencl application, the non-linearity of the filter output waveform prevents the pen position counter (which is being incremented at a constant rate) from accurately interpolating between grid conductor locations. The digitizing system of FIGS. 1A and 1B is capable of resolution of 0.2 mils to 0.5 mils when grid conductor spacings of 200 mils are used, whereas the resolution of the system described in the copending second Fencl application is approximately 5 mils, when 200 ml grid conductor spacings are used.

The above described up/down scanning and averaging technique is then repeated in a similar fashion to obtain the precise Y coordinate of the location of pen coil 15.

Figure 9A:
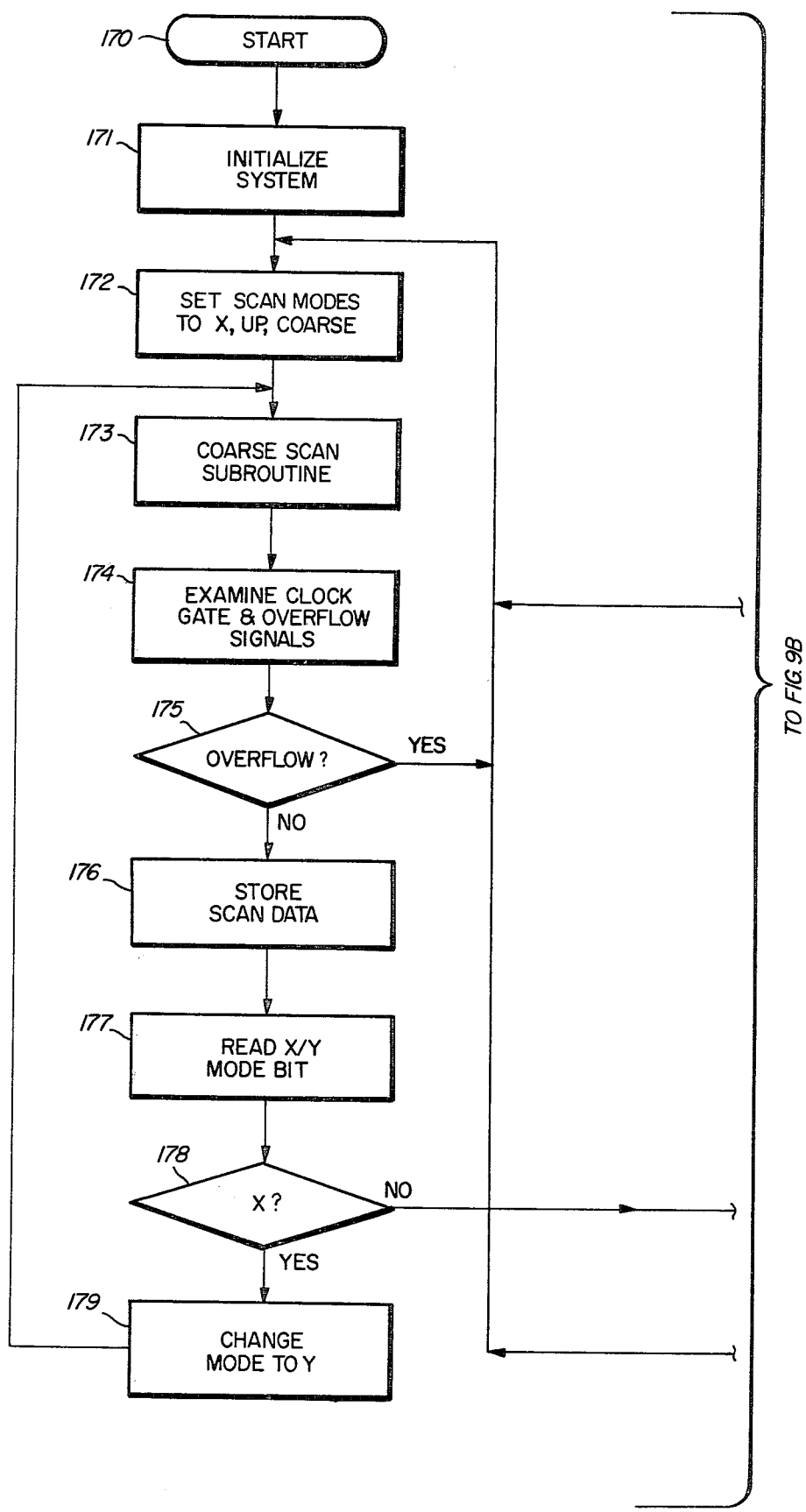
FIGS. 9A–9B constitute a flow chart describing the basic operations performed by microprocessor system 53 of FIG. 1A.
Figure 9B:
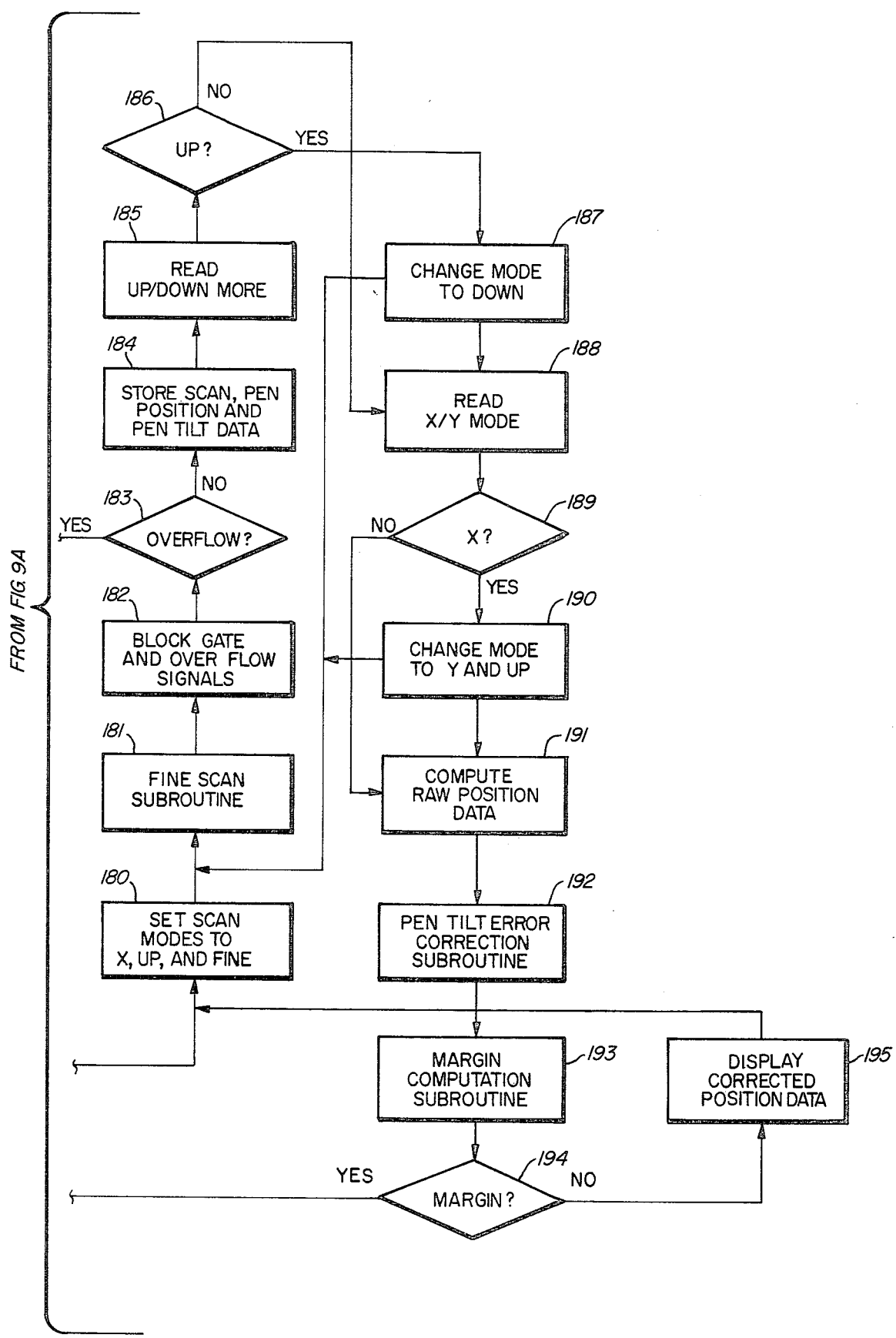

The flow chart shown in FIGS. 9A and 9B discloses the operation algorithm implemented or executed by microprocessor system 53 to carry out the above described up/down scanning and averaging technique.

Figure 7A:
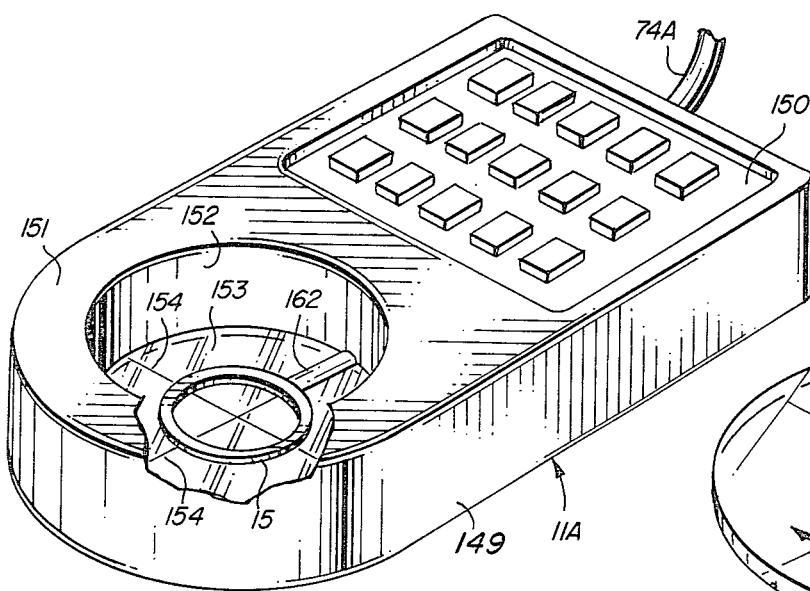
FIG. 7A is a perspective view of a cursor which can be utilized in place of the pen of FIG. 1B.

Referring now to FIG. 1B, Pen 11 and its associated pen coil 15 can be replaced by a cursor if it is desired to digitize points already marked on the work sheet supported by tablet 5 without making any further marks on the work sheet. Cursor 11A of FIG. 7A is such a cursor. Cursor 11A has a housing 149, which housing includes a ring-shaped section 151 with a circular aperture 152 therein. A keyboard 150 includes a plurality of keys which can be used by the operator to send control commands via cable 74A, which includes conductor 75 shown in FIG. 1A. The commands are routed via apprpriate input ports to data bus 51 and to microprocessor system 53.

It should be noted that cursor 11A is a hand-held device having a flat bottom which is held against and slid along the surface of a work sheet. Cross hairs 154 are visually aligned with the point to be digitized on the work sheet. When the user has accomplished this alignment, he presses appropriate ones of the keys on keyboard 150 to initiate the previously described scanning operations. When the microprocessor system has caused the digitizing operation to be completed for the selected point, the microprocessor system generates a signal which causes alarm 47 to alert the operator that cursor 11A can be moved to a new point to be digitized.

Figure 7B:
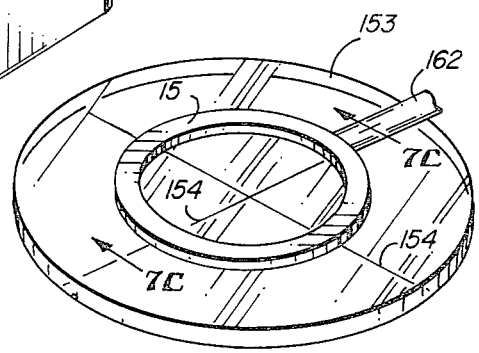
FIG. 7B is a perspective view of a glass plate, hairline, and cursor coil assembly of the cursor of FIG. 7A.
Figure 7C:
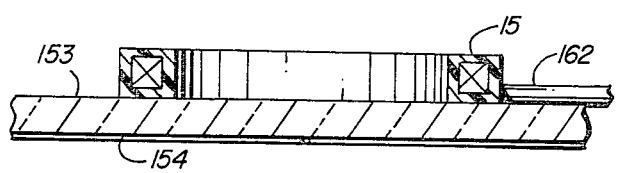
FIG. 7C is a partial sectional view taken along section lines 7C—7C of FIG. 7B.

Referring now to FIGS. 7A, 7B, and 7C, a transparent glass or plastic disc 153 is attached within aperture 152 so that the bottom surface of disc 153 lies in the same plane as the flat bottom of cursor 11A. The pair of perpendicular cross hairs 154 are preferably etched in the glass disc 153. A cursor coil 15, which can be similar to pen coil 15 in FIG. 1, is formed on a thin coil form having a diameter of approximately 1.0 inches. Cursor coil 15 is symmetrically disposed about the intersection of cross hairs 154. The drive signal from power amplifier 72 of FIG. 7A is supplied by cable 74A and wires 162.

In accordance with one feature of the invention, the space between the outer perimeter of transmitting coil 15 and the inside of aperture 152 is approximately 0.7 inches. Housing 149 is composed of high conductivity aluminum, which acts as a shield which greatly reduces the magnetic field intensity at points outward of the inner wall of aperture 152.

Figure 8A:
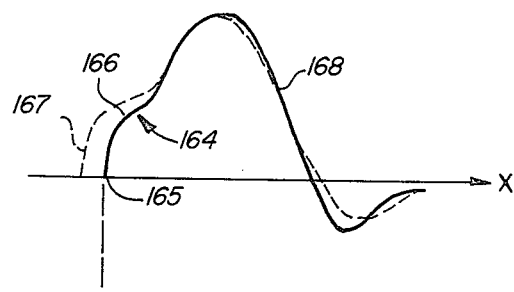
FIG. 8A is a waveform useful in illustrating error which may occur in the output waveform of filter 130 of FIG. 2.

The curve 164 in FIG. 8A illustrates the waveform at filter output 128 (FIG. 2) during the up scanning operation if no guard ring of the type described above is used. The contribution of signals induced in conductors to the left of point 165 is not represented in waveform 164, since the up scan begins at point 165, which is two inches to the left of the coarse coordinate obtained during the previously described initial scan operation. Thus, curve 164, indicated by the solid line in FIG. 8A, has a shoulder (indicated by reference numeral 166) which rises sharply from zero). Dotted line 167 in FIG. 8A indicates another shape of the waveform at filter output 128 if the cursor is initially located at a slightly different position for waveform 166, such that the up scanning operation includes an additional conductor; it can be seen that the slope at portion 168 of curve 167 is slightly reduced compared to that of curve 166. This effect induces errors which prevent accurate interpolation between grid wires (since the counting rate of pen position counter 115 is constant).

Figure 8B:
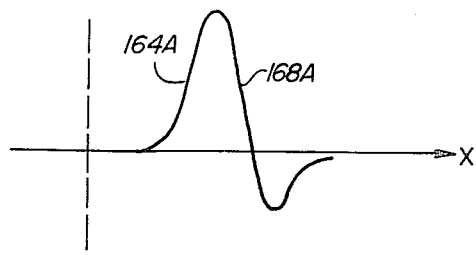
FIG. 8B is a waveform useful in describing the improvement in the output waveform of filter 130 of FIG. 2 when a guard ring is utilized in conjunction with a cursor.

FIG. 8B shows the waveform 164A at filter output 128 if the cursor shown in FIG. 7A having a high conductivity ring 151 as described above is utilized, preventing the magnetic field beyond the inner wall of aperture 152 from being appreciable. This causes waveform 164A to have a much sharper peak and a much steeper slope at portion 168A thereof than waveform 164 of FIG. 8A. Another advantage is that variations in the initial cursor position less in magnitude than the spacing between grid conductors causing an additional grid conductor to be included in the up scan (or down scan) do not cause appreciable variation in the slope of portion 168A of waveform 164A, thereby improving the accuracy of interpolation between grid wires.

Figure 7E:
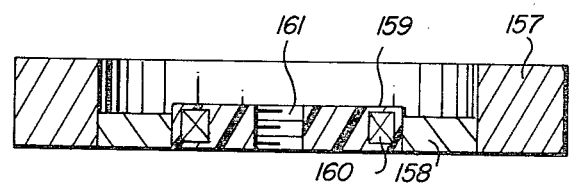
FIG. 7E is a partial sectional diagram taken along section lines 7E—7E of FIG. 7D.
Figure 7D:
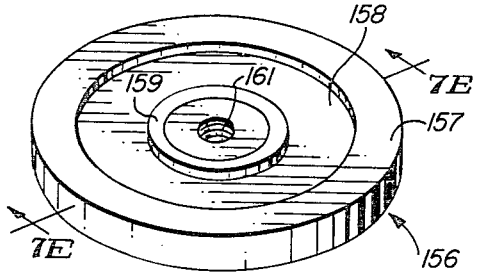
FIG. 7D is a perspective view of a coil and guard ring assembly which can be utilized in conjunction with an alternative type of cursor.

FIGS. 7D and 7E disclose a guard ring structure which can be utilized in conjunction with a cursor or even a pen carried on a precision carriage. Guard ring structure 156 includes an aluminum guard ring 157 which is supported by a plastic annular spacer 158. A plastic coil form 159 having an outside diameter of approximately one inch supports a coil 160. Coil form 159 has a hole 161 by means of which guard ring structure 156 can be attached to a cursor or pen.

Referring now to FIGS. 9A-9B, the flow chart of the operating algorithm of microprocessor system 53 is described. The algorithm begins at start label 170. The operating algorithm then enters block 171, and performs the usual initializing operations necessary for ordinary microprocessor systems, such as setting the stack pointer of the microprocessor system to a known memory address. In this case, the initialization operation turns off clock gate 78 by means of a signal on conductor 82, and sets a plurality of flags indicating the initial operating mode of the system. Those skilled in the art can readily provide details of such initializing operations.

In block 172, the algorithm establishes the mode of operation to cause "up scanning" in the X direction and establishes the scan counter frequency for the "coarse" scanning operation previously mentioned. The algorithm then then enters block 173, whereby it executes a "coarse scan" subroutine, wherein the scan counter and decoder circuit 104 is incremented as previously explained, causing the X multiplexer circuitry 19 to scan the X coordinates until the previously described "good data" signal is produced by analog signal detector circuitry 27, disabling clock gate 78.

Next, the operating algorithm enters block 174 and respectively tests the clock gate and overflow signals until either an overflow signal occurs (for example, as a result of the pen being lifted during the scanning operation) or until a "good data" signal is received by clock gate circuit 78 in response to analog signal detector 27 via conductor 98. As indicated by decision block 175, if an overflow condition is detected, the algorithm returns to block 172 and resets the scan modes to provide coarse up scanning in the X direction. If there is no overflow, the algorithm stores the contents of scan counter and decoder circuit 104, as indicated in block 176.

Next, the microprocessor reads an "X/Y mode" bit of a mode register in the microprocessor system, which mode flag register stores all of the possible X, Y, up, down, coarse, and fine mode flags. The result will be that the X/Y mode bit indicates scanning in the X mode, and decision block 178 therefore will be exited to block 179, wherein the microprocessor system will set the Y mode flag in the mode flag register. The microprocessor then will reexecute the coarse scan subroutine of block 173, causing the coarse scanning operation to be performed in the direction from the "Y" initial reference point. The algorithm passes through block 174 and decision block 175 as before, and stores the contents of scan counter and decoder circuit 104. At this point, the approximate or "coarse" X and Y coordinates of the present pen position are now stored in the microprocessor system.

When the algorithm reads the X/Y mode bit, as indicated in block 177, decision block 178 will find that the present mode is not the X mode, so the algorithm then will move to block 180, wherein the microprocessor system sets the scan mode flags to establish "fine" up scanning in the X direction. The algorithm then executes a "fine" scan subroutine wherein the scan counter and decoder circuit 104 and pen position counter 115 are incremented (at a slower rate to provide increased precision). Execution of the fine scan subroutine is indicated by block 181 in FIG. 9B. Next, the algorithm examines the clock gate and overflow signals in block 182 in the same manner as in block 174, previously discussed.

In decision block 183, if overflow is detected, the algorithm reenters block 172, and the coarse scan portion of the operating algorithm is reexecuted, since any data obtained during fine scanning will be useless if an overflow condition occurs.

If no overflow condition occurs, the algorithm causes the contents of the scan counter and decoder circuit 104, pen position counter 115 and pen tilt data produced by analog to ditigal converter 33 to be stored in the memory of microprocessor system 53. This portion of the algorithm is indicated by block 184.

Next, the up/down bit of the mode flag register is read, indicating that in decision block 186 the present mode is the up mode. The algorithm then enters block 187, causing the scanning mode to be changed to the down mode, and reenters the fine scan subroutine, as indicated by block 181. Down scanning operations are then executed in blocks 181-186 in the same manner as previously, except that when the up/down bit of the mode flag register in microprocessor system 53 is read, decision block 186 determines that the scanning is not in the up mode, causing the algorithm to go to block 188 and read the X/Y bit of the mode flag register. At this point, decision block 189 will determine that scanning is occurring in the X direction, and the algorithm will enter block 190 and change the scanning mode to up scanning in the Y direction. The algorithm then will reexecute blocks 181-186 as before. Decision block 186 will determine that scanning in the up direction is occurring and block 187 will be entered. The scanning mode will be changed to the down scanning mode, and again blocks 181-186 will be executed. Decision block 186 will produce the result that scanning in the up direction is not occurring, so block 188 will be entered. Decision block 189 will determine that scanning in the X direction is not occurring, and block 191 will be entered by the algorithm.

Microprocessor system 53 then will average the stored pen position data numbers obtained during up and down scanning in the X direction to produce an average X coordinate of the pen position. Microprocessor system 53 will similarly average the stored pen position data obtained in the up and down scanning operations in the Y direction to produce an average Y pen position coordinate. The algorithm then enters block 192 and executes the previously described pen tilt error correction procedure in a suitable subroutine, which, in view of the previous discussion of the method of compensating pen tilt, readily can be provided by those skilled in the art.

Next, the algorithm compares the finally determined pen position coordinates to the margin, which is a three inch margin around the tablet in the described embodiment of the invention. If the pen position is located within the three inch margin, decision block 194 routes the operating algorithm back to block 172, since pen positions within the margin are not accepted. If the above determined pen coordinate position is not within the margin, the operating algorithm enters block 195 and displays the corrected position data, which precisely indicates pen position, even if the pen is tilted. The algorithm then enters block 180, and establishes the operating mode to perform fine scanning in the X direction. The algorithm thereby provides continuous calculations of pen position coordinates and continuous display thereof.

It should be emphasized that the basic above described method of performing a coarse scanning operation, then performing an up scanning operation, then a down scanning operation, and averaging the coordinates obtained as a result of the up and down scanning operations, can be readily applied to different hardware configurations than those disclosed in the drawings. The basic method can also be used for digitizer systems in which drive currents are sequentially drawn into the grid conductors during the scanning procedure, and signals induced thereby in the pen or cursor coil are sensed and processed to provide control signals which stop a position counter. The details of alternate hardware configurations are set forth in U.S. Pat. Nos. 3,767,858; 3,851,097; 3,983,322; 4,022,971 and 3,886,311, all incorporated herein by reference.

I claim:

1. A method of digitizing the location of a coil with respect to a plurality of spaced parallel conductors in a support surface element of a digitizer including i. a scanning circuit for sequentially sensing ones of the conductors having signals induced therein by the coil, ii. an analog circuit for producing an output signal which indicates when the scanning circuit senses any of the conductors having an induced signal which is out of phase with the induced signal in the previously sensed conductors, said method comprising the steps of:

a. performing a first scanning of conductors from a reference point toward the coil location until a first conductor is sensed having thereon an induced signal which is out of phase with the induced signal on the previously sensed conductor;

b. performing a second scanning of conductors toward the first conductor from a second conductor located a first distance from the first conductor on one side of the coil approximately unti the time that the output signal of the analog circuit indicates a reversal in phase between sequentially sensed ones of said conductors and storing a first number representing the time required for said second scanning;

c. performing a third scanning of conductors toward the first conductor from a third conductor located a second distance from the first conductor on the opposite side of the coil approximately until the time that the output signal of the analog circuit indicates a reversal in phase between sequentially sensed ones of said conductors and storing a second number representing the time required for said third scanning; and d. computing the average value of said first and second numbers, whereby said average value represents the location of the coil with respect to the plurality of conductors.

2. The method of claim 1 including the steps of detecting the peak levels of the output signals of said analog circuit during said first and second scannings, respectively, converting said peak levels to third and fourth numbers, respectively, storing said third and fourth numbers, and utilizing said third and fourth numbers to compute a correction number to add to or subtract from said average value to compensate for tilt of the coil during said first and second scannings.

3. The method of claim 1 wherein the plurality of spaced conductors are oriented in a first direction, wherein a second plurality of spaced conductors are perpendicular to the first plurality of spaced conductors, said method including repeating steps (a) through (c) for the second plurality of conductors, and also computing the average value of the first and second numbers resulting from said repeating to obtain the location of the coil with respect to the second plurality of conductors.

4. The method of claim 1 wherein said first distance and said second distance are substantially equal.

5. The method of claim 4 wherein said coil produces a substantially symmetrical field.

6. The method of claim 3 further including reversing the phase of a pen drive signal driving the coil before said repeating of steps (a) through (c).

7. The method of claim 1 wherein said second and third scanning are preformed at a slower rate than said first scanning to increase the accuracy of the output signal of the analog circuit.

8. The method of claim 4 wherein said first distance is approximately two inches.

9. The method of claim 2 wherein said utilizing of said third and fourth numbers includes computing the ratio of said third and fourth numbers, producing an address representing said ratio, and utilizing said address to access a location of a memory containing said correction number.

10. The method of claim 1 wherein the scanning circuit includes a scan counter which controls the rate of the sequential sensing of the scanning circuit and a position counter which counts at a substantially higher rate than the scan counter, said method including stopping the position counter in response to said occurrences of said phase reversals, respectively, to obtain said first and second numbers, respectively.

11. The method of claim 1 wherein the scanning circuit includes a scan counter which controls the rate of the sequential sensing of the scanning circuit and a position counter which counts at a substantially higher rate than the scan counter, and wherein said second and third scanning steps include stopping the position counter in response to exceeding of a predetermined threshold level by the output of the analog circuit during said second and third scanning steps, respectively, to obtain said first and second numbers, respectively.

12. The method of claim 1 wherein said analog circuit output signal indicates when the scanning circuit senses any of the conductors having an induced signal which is out of phase with the induced signal in the previously sensed conductor by changing polarity.

13. A method of digitizing the location of a coil with respect to a plurality of spaced parallel conductors in a support surface element of a digitizer including i. a scanning circuit for sequentially electrically operating the conductors and producing drive currents in the conductors, ii. an analog circuit responsive to signals induced in the coil in response to the drive currents for producing an output signal which changes phase in response to the the scanning circuit electrically operating on one of the conductors which is located in the opposite side of the coil from the last conductor operated on, said method comprising the steps of:

a. performing a first scanning of conductors from a reference point toward the coil location until a polarity change in the output signal is produced by the analog circuit;

b. performing a second scanning of conductors toward the first conductor from a second conductor located a first distance from the first conductor on one side of the coil until a polarity reversal occurs in the resulting output signal of the analog circuit and storing a first number representing the time required for said second scanning;

c. performing a third scanning of conductors toward the first conductor from a third conductor located a second distance from the first conductor on the opposite side of the coil until a phase reversal occurs in the resulting output signal of the analog circuit and storing a second number representing the time required for said third scanning; and d. computing the average value of said first and second numbers, whereby said average value represents the location of the coil with respect to the plurality of conductors.

14. A method of digitizing the location of a transmitting coil of a movable element with respect to a plurality of uniformly spaced parallel conductors in a surface located adjacent to the transmitting coil, the transmitting coil inducing signals in the conductors, the location of the transmitting coil being the location of an axis of symmetry of a magnetic field produced by the transmitting coil, said method comprising the steps of:
  a. performing a first scanning of conductors from a reference point toward the coil location until a first one of the conductors is sensed having an induced signal thereon which is out of phase with the induced signal on the previously sensed conductor;
  b. presetting a counter to a first digital number representing a second conductor located a first distance to one side of the first conductor;
  c. sequentially sensing, rectifying and integrating a first group of signals on the ones of said conductors on a first side of the axis to produce a first output signal and simultaneously incrementing the counter at a frequency exceeding the rate of said sensing, said incrementing being synchronous with said sensing, said conductors being sensed in a sequential order toward said axis from said second conductor;
  d. detecting a polarity change in said first output signal, said counter containing a second digital number at the time of said first polarity change;
  e. storing said second digital number;
  f. presetting the counter to a third digital number representing a third conductor located a second distance on the side of said third conductor opposite to said one side of the said first conductor;
  g. sequentially sensing, rectifying and integrating a second group of induced signals on the ones of said conductors on said opposite side of the axis to produce a second output signal and simultaneously decrementing the counter at said frequency, said decrementing being synchronous with said sensing, said conductors being sensed in a sequential order toward said axis from said third conductor;
  h. detecting a polarity change in said second output signal, said counter containing a fourth digital number at the time of said second polarity change; and
  i. computing the average of said second and fourth digital numbers, said average representing the location of said axis with respect to the conductors.

15. A digitizer comprising:
  a. a coil;
  b. a plurality of spaced parallel conductors embedded in a surface element of the digitizer;
  c. circuit means for producing an alternating current in said coil causing said coil to induce signals in at least a plurality of said conductors;
  d. scanning circuit means for sequentially sensing ones of said conductors having said induced signals;
  e. analog circuit means responsive to said scanning circuit means for producing an output signal which indicates when said scanning circuit means senses any conductor having an induced signal thereon which is out of phase with an induced signal in the previously sensed conductor;
  f. first scanning means for effecting a first scanning operation, said first scanning operation including scanning on a first plurality of said conductors by causing said scanning circuit means to sequentially sense said first plurality of conductors from a reference point toward a particular location of said coil until a first one of said conductors is sensed, said first conductor having thereon an induced signal which is out of phase with the induced signal in the previously sensed conductor;
  g. second scanning means for effecting a second scanning operation, said second scanning operation including scanning of a second plurality of said conductors by causing said scanning circuit means to sequentially sense said second plurality of conductors from a second conductor located a first distance from the first conductor on one side of the coil toward said first conductor until the output signal of said analog circuit means indicates sensing of a conductor having thereon an induced signal which is out of phase with the induced signal on the previously sensed conductor;
  h. first storage means for storing a first number representing the time required for said second scanning;
  i. third scanning means for effecting a third scanning operation, said third scanning operation including scanning of a third plurality of said conductors by causing said scanning circuit means to sequentially sense said third plurality of conductors from a third conductor located said first distance from said first conductor on the opposite side of said coil toward said first conductor until the output signal of said analog circuit means indicates sensing of a conductor having thereon an induced signal which is out of phase with the induced signal on the previously sensed conductor;
  j. second storage means for storing a second number representing the time required for said third scanning; and
  k. computing means for computing the average valve of said first and second numbers, whereby said average value represents the location of the coil with respect to the plurality of conductors.

16. The digitizer of claim 15 further including analog means for changing the phase of said alternating current by one hundred eighty degrees after said second scanning and before said third scanning.

17. The ditigizer of claim 16 wherein said analog circuit means includes:
  a. amplifier means responsive to said scanning circuit means for producing first and second complementary output signals representing sensed induced signals;
  b. rectifying means for recitfying said first and second complementary output signals, respectively, to produce third and fourth complementary signals which change polarity in response to a reversal in phase between said induced signals in sequentially scanned ones of said conductors;
  c. filter means for integrating said third and fourth complementary signals to produce first and second complementary filter output signals, respectively, which also change polarity; and
  d. comparator means responsive to said first and second filter output signals for producing a control signal which indicates changing of polarity of said first and second filter output signals.

18. The digitizer of claim 15 further including a counter and means for incrementing and decrementing said counter at a predetermined rate during said second and third scannings, respectively, said first and second numbers being contained in said counter when said output signal of said analog circuit means indicates said sensing during said second and third scannings, respectively.

19. The digitizer of claim 18 further including means responsive to said output signal of said analog circuit means for stopping said incrementing of said counter.

20. The digitizer of claim 19 further including means for entering third and fourth numbers into said counter prior to said second and third scannings, respectively, said third number representing the location of said second conductor and said fourth number representing the location of said third conductor.

21. The digitizer of claim 15 further including:
a. means for detecting peak levels of the output signals of said analog circuit means during said first and second scannings, respectively;
b. means for converting said peak levels to third and fourth numbers, respectively;
c. means for storing said third and fourth numbers; and
d. said computing means operating upon said stored third and fourth numbers to compute a correction number for modifying said average value to compensate for tilt of said coil during said first and second scannings.

22. The digitizer of claim 15 wherein said first and second storage means and said computing means are included in a microprocessor system.

23. The digitizer of claim 15 further including a conductive guard ring concentrically disposed with respect to said coil, said conductive guard ring having an inside radius less than said first distance, whereby induced signals in ones of said conductors more distant from the axis of field symmetry of said coil than said inside radius do not significantly contribute to said output signal of said analog circuit means.

24. The digitizer of claim 23 wherein said conductive guard ring is positioned approximately the same distance from said surface element as said coil.

* * * * *